(12) United States Patent
Jones et al.

(10) Patent No.: US 9,291,062 B2
(45) Date of Patent: Mar. 22, 2016

(54) METHODS OF FORMING BLADES AND METHOD FOR RENDERING A BLADE RESISTANT TO EROSION

(75) Inventors: Michael Lewis Jones, Scotia, NY (US); Swami Ganesh, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 690 days.

(21) Appl. No.: 13/607,046

(22) Filed: Sep. 7, 2012

(65) Prior Publication Data

US 2014/0072715 A1    Mar. 13, 2014

(51) Int. Cl.
| | |
|---|---|
| *B05D 3/12* | (2006.01) |
| *B23K 31/02* | (2006.01) |
| *B05D 1/36* | (2006.01) |
| *F01D 5/28* | (2006.01) |

(52) U.S. Cl.
CPC .............. *F01D 5/288* (2013.01); *B23K 26/342* (2015.10); *B23K 26/702* (2015.10); *F01D 5/286* (2013.01); *B23K 2201/001* (2013.01); *F05D 2220/31* (2013.01)

(58) Field of Classification Search
CPC ........... B23K 2201/001; B23K 26/345; B23K 26/422; F01D 5/287; F01D 5/288
See application file for complete search history.

(56) References Cited

U.S. PATENT DOCUMENTS

| | | | |
|---|---|---|---|
| 5,112,187 A | 5/1992 | Davids et al. | |
| 5,183,390 A | 2/1993 | Amos | |
| 5,190,598 A | 3/1993 | Qureshi | |
| 5,351,395 A | 10/1994 | Crawmer et al. | |
| 6,375,417 B1 | 4/2002 | Hofer et al. | |
| 2002/0014208 A1 | 2/2002 | Roberts et al. | |
| 2002/0064678 A1 | 5/2002 | Kiyotoki et al. | |
| 2002/0098083 A1 | 7/2002 | Blangetti et al. | |
| 2002/0114700 A1 | 8/2002 | Markytan | |
| 2003/0183529 A1 | 10/2003 | Ohara | |
| 2004/0091639 A1 | 5/2004 | Giannozzi | |
| 2004/0106000 A1 | 6/2004 | Giannozzi | |
| 2005/0207880 A1 | 9/2005 | Tarelin et al. | |
| 2007/0190351 A1 | 8/2007 | Eichmann et al. | |
| 2007/0190352 A1 | 8/2007 | Bayer et al. | |

(Continued)

FOREIGN PATENT DOCUMENTS

| | | |
|---|---|---|
| DE | 102005046721 B3 | 10/2006 |
| DE | 102005046720 A1 | 4/2007 |

(Continued)

OTHER PUBLICATIONS

American Society for Testing and Materials. FAQ. Jun. 2, 2011.*

*Primary Examiner* — Dah-Wei D Yuan
*Assistant Examiner* — Kristen A Dagenais
(74) *Attorney, Agent, or Firm* — McNees Wallace & Nurick LLC

(57) ABSTRACT

Methods of forming a blade and rendering a blade resistant to erosion includes positioning a backing plate(s) or elongated backing plate(s) adjacent at least one side of a forward face of a leading edge surface of the blade. The methods include depositing an erosion resistant material in a plurality of layers by fusion bonding the erosion resistant material to the forward face of the leading edge surface of the blade. The backing plates providing a template or guide for depositing the plurality of layers of erosion resistant material. The plurality of layers of erosion resistant material form an erosion shield and a leading edge of the blade. Methods include removing the backing plate.

20 Claims, 6 Drawing Sheets

(56) References Cited

U.S. PATENT DOCUMENTS

| | | | |
|---|---|---|---|
| 2008/0050221 A1 | 2/2008 | Burdgick et al. | |
| 2009/0081478 A1 | 3/2009 | Seth | |
| 2009/0162207 A1 | 6/2009 | Peters et al. | |
| 2009/0193656 A1 | 8/2009 | Spiegel et al. | |
| 2009/0308847 A1* | 12/2009 | Kamimura et al. | 219/76.1 |
| 2010/0034661 A1 | 2/2010 | Rajagopalan | |

FOREIGN PATENT DOCUMENTS

| | | |
|---|---|---|
| EP | 507131 A1 | 10/1992 |
| EP | 520711 A1 | 12/1992 |
| EP | 574290 A1 | 12/1993 |
| EP | 1156189 A1 | 11/2001 |
| EP | 1744018 A1 | 11/2007 |
| GB | 2423090 A | 8/2006 |
| GB | 2424423 A | 9/2006 |
| GB | 2424454 A | 9/2006 |
| JP | 3071977 | 3/1991 |
| JP | 4289154 A | 10/1992 |
| JP | 6123202 | 5/1994 |
| JP | 6173604 | 6/1994 |
| JP | 6287770 | 11/1994 |
| JP | 10299410 | 11/1998 |
| JP | 2001055904 | 2/2001 |
| JP | 2001090506 | 4/2001 |
| JP | 2002106301 | 4/2002 |
| JP | 2003027206 | 1/2003 |
| JP | 2004003403 | 1/2004 |
| JP | 2004124751 | 4/2004 |
| JP | 2007170211 | 7/2007 |
| JP | 2007332778 | 12/2007 |
| JP | 2009191733 | 8/2009 |
| WO | 9635825 | 11/1996 |
| WO | 2006994935 A1 | 9/2006 |
| WO | WO 2006094935 A1 * | 9/2006 |
| WO | 2008030324 A2 | 3/2008 |
| WO | 2008122563 A2 | 10/2008 |

* cited by examiner

METHODS OF FORMING BLADES AND METHOD FOR RENDERING A BLADE RESISTANT TO EROSION

FIELD OF THE INVENTION

The present invention relates generally to power generation systems and more specifically to a method of forming a blade for a turbine and a method for rendering a turbine blade resistant to erosion.

BACKGROUND OF THE INVENTION

Components in power generation systems, such as the turbine rotor blades and the turbine stator blades that are used in turbine equipment are exposed to an erosive environment in which these components are susceptible to erosion caused by water droplets in the steam and by fine dust from oxide scale. In particular, water droplets can cause substantial erosion of rear-stage turbine blades, where such water droplets are mixed into the steam for turbine driving. Erosion of turbine blades is problematic because it results in loss of blade chord width, loss of turbine efficiency, and fatigue breakdown of the blade brought about by erosion.

Various erosion preventive measures have been implemented to try to increase the durability of turbine components against erosion. One preventative measure involves using low heat-input build-up welding with a high energy-density heat source, such as laser beams to build up a plurality of single layers on the turbine component.

The residual stresses (tensile residual stresses) caused by contraction during build-up welding increases as the STEL-LITE® build-up amount becomes greater. These residual stresses, which are difficult to remedy significantly through heat treatment after build-up welding, may give rise to spalling in the form of peeling of the end of the build-up portion, or cracking at the weld metal portions, in the environment where the turbine operates.

Therefore, methods of forming a blade and a method for rendering a blade resistant to erosion that do not suffer from the above drawbacks is desirable in the art.

SUMMARY OF THE INVENTION

According to an exemplary embodiment of the present disclosure, a method of forming a blade is provided. The method includes positioning a backing plate adjacent at least one side of a forward face of a leading edge surface of the blade. The method includes depositing an erosion resistant material in a plurality of layers by fusion bonding the erosion resistant material to the forward face of the leading edge surface, wherein the plurality of layers of erosion resistant material form an erosion shield and a leading edge of the blade. The method includes removing the backing plate, wherein the erosion shield is substantially free of any diffusion layer induced by the backing plate.

According to another exemplary embodiment of the present disclosure, a method of forming a blade is provided. The method includes positioning an elongated backing plate adjacent at least one side of a forward face of a leading edge surface of the blade. The method includes depositing an erosion resistant material along the elongated backing plate by fusion bonding the erosion resistant material to the forward face of the leading edge surface and the elongated backing plate, wherein the erosion resistant material forms an erosion shield and a leading edge of the blade. The method includes removing the backing plate wherein the erosion shield is substantially free of any diffusion layer induced by the backing plate.

According to another exemplary embodiment of the present disclosure, a method for rendering a blade resistant to erosion is provided. The method includes positioning a backing plate adjacent to at least one side of a forward face of a leading edge surface of the blade. The method includes bonding an erosion resistant material to the forward face of the leading edge surface of the blade, wherein the erosion resistant material forms an erosion shield and a leading edge of the blade. The method includes heat treating the blade and the erosion shield and removing the backing plate wherein the erosion shield is substantially free of any diffusion layer induced by the backing plate.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
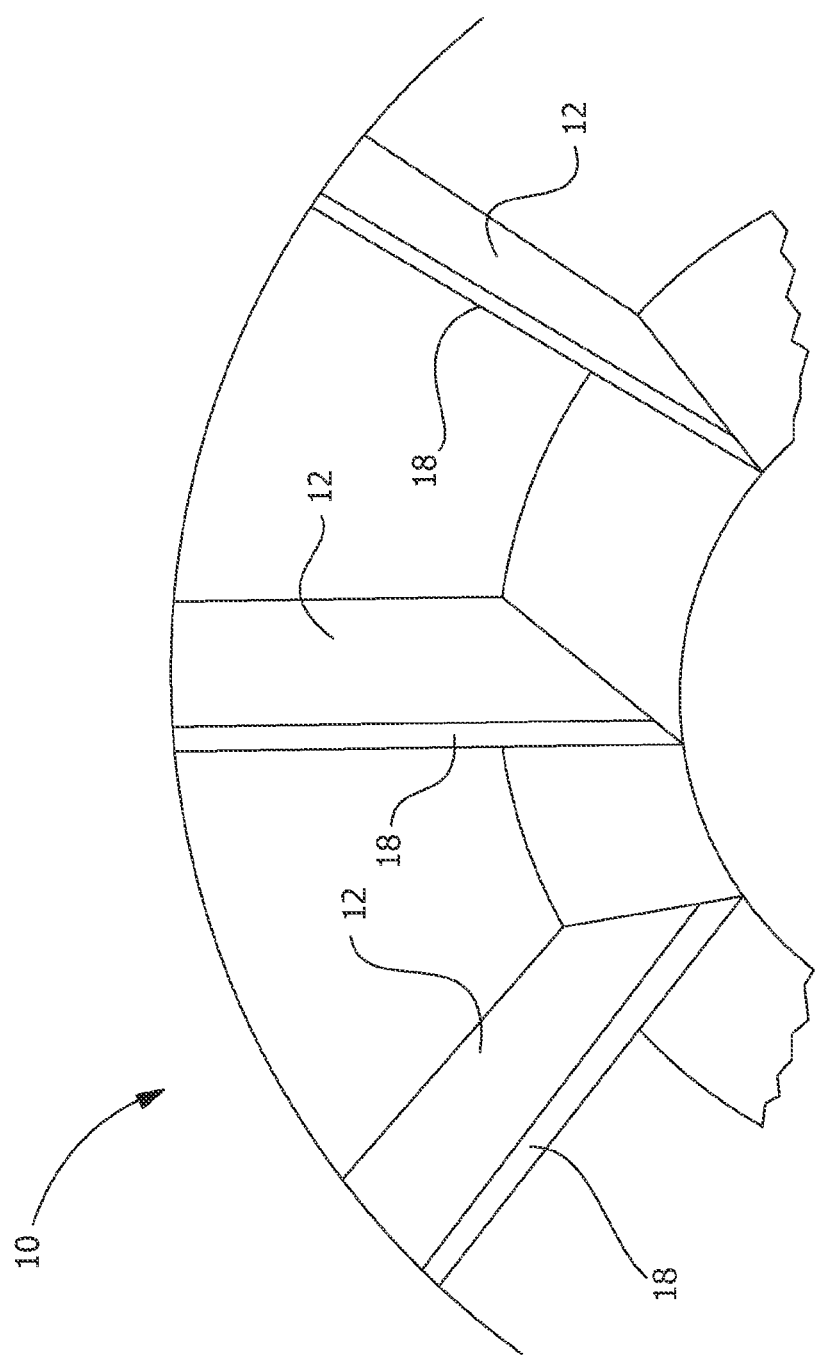
FIG. 1 is a partial perspective view of an embodiment of a turbine.

Provided are methods of forming a blade for a turbine and a method for rendering a turbine blade resistant to erosion that do not suffer from the drawbacks in the prior art. One advantage of an embodiment of the present disclosure is that the method allows for stronger and less stressed joining of two dissimilar metals. Another advantage is the backing plates of the present disclosure provide support for laser cladding buildup on the leading edge of the blade. Yet another advantage is that the cladding of the erosion resistant material is built up from the backing plate and the cutoff edge of the blade simultaneously. Another advantage is a larger melt pool can be produced using the backing plate of the present disclosure, which allows for more cladding powder to be deposited into the melt pool. Yet another advantage of an embodiment of the present disclosure is that the method allows for greater cladding application speeds and reduced cycle time because of the larger melt pool and additional amount of cladding powder that can be deposited into the melt pool. Another advantage of the present disclosure allows for variations in blades. Yet another advantage of the present disclosure is that the backing plate reduces overspray during application of the erosion shield. Another advantage is the backing plate provides a starting point for the laser cladding apparatus to better align with the edge to apply the erosion shield. Yet another advantage is that the joining method provides a supported erosion shield application method. Another advantage of the joining method is that it provides better erosion shield application accuracy. Yet another advantage of the present disclosure is that the backing plate provides a mold to shape the leading edge into a final configuration, thereby eliminating additional machining steps after forming the erosion shield.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Systems used to generate power include, but are not limited to, gas turbines, steam turbines, and other turbine assemblies. In certain applications, the power generation systems, including the turbomachinery therein (e.g., turbines, compressors, and pumps) and other machinery may include components that are exposed to heavy wear conditions. For example, certain power generation system components such as blades, casings, rotor wheels, shafts, shrouds, nozzles, and so forth, may operate in high heat, high revolution environments and erosive environments. As a result of the extreme environmental operating conditions, these components may have to be manufactured using erosion resistant materials to extend service life of the components.

Figure 2:
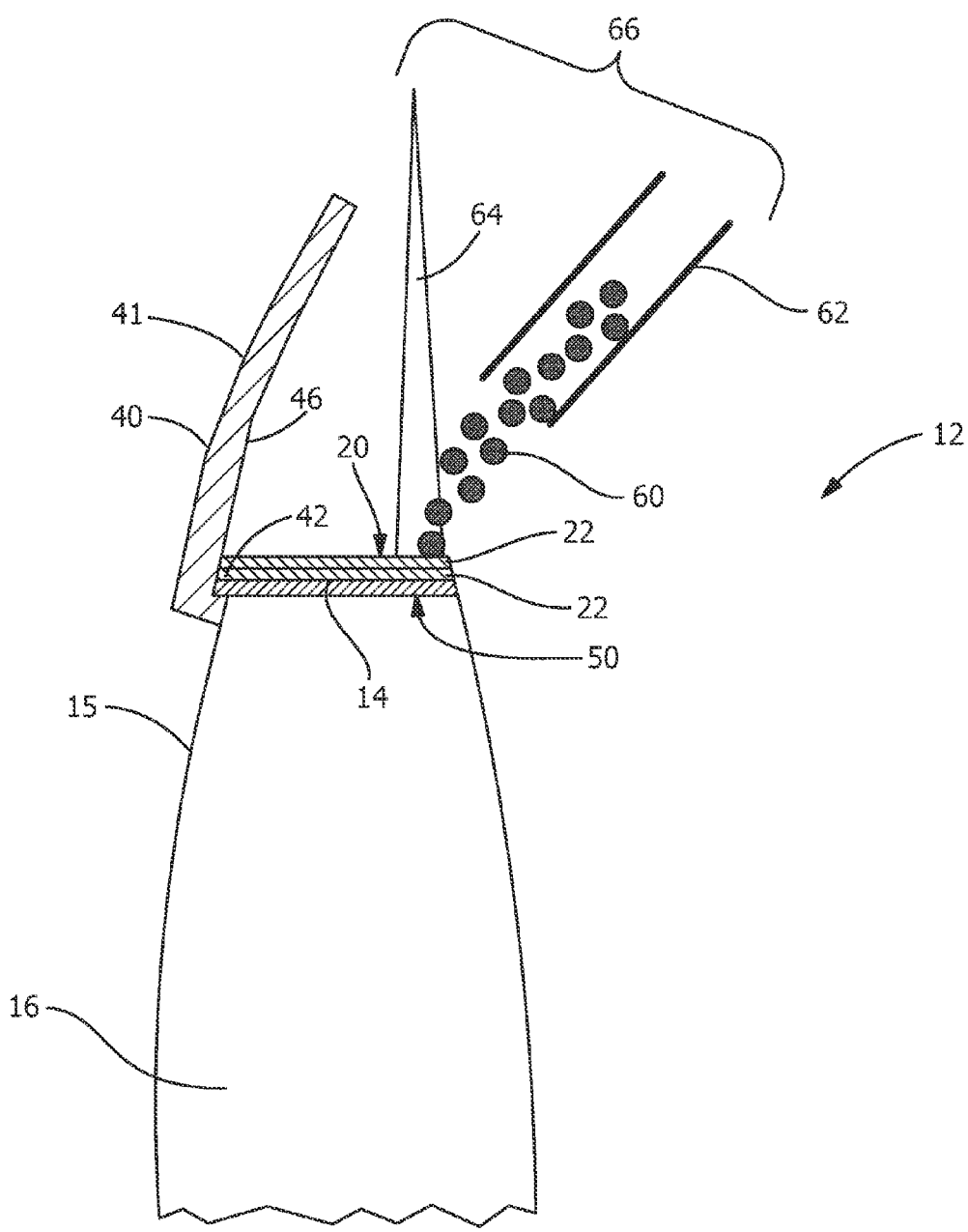
FIG. 2 is a schematic view of laser powered source applying a first layer of erosion resistant material using a backing plate of the present disclosure.
Figure 3:
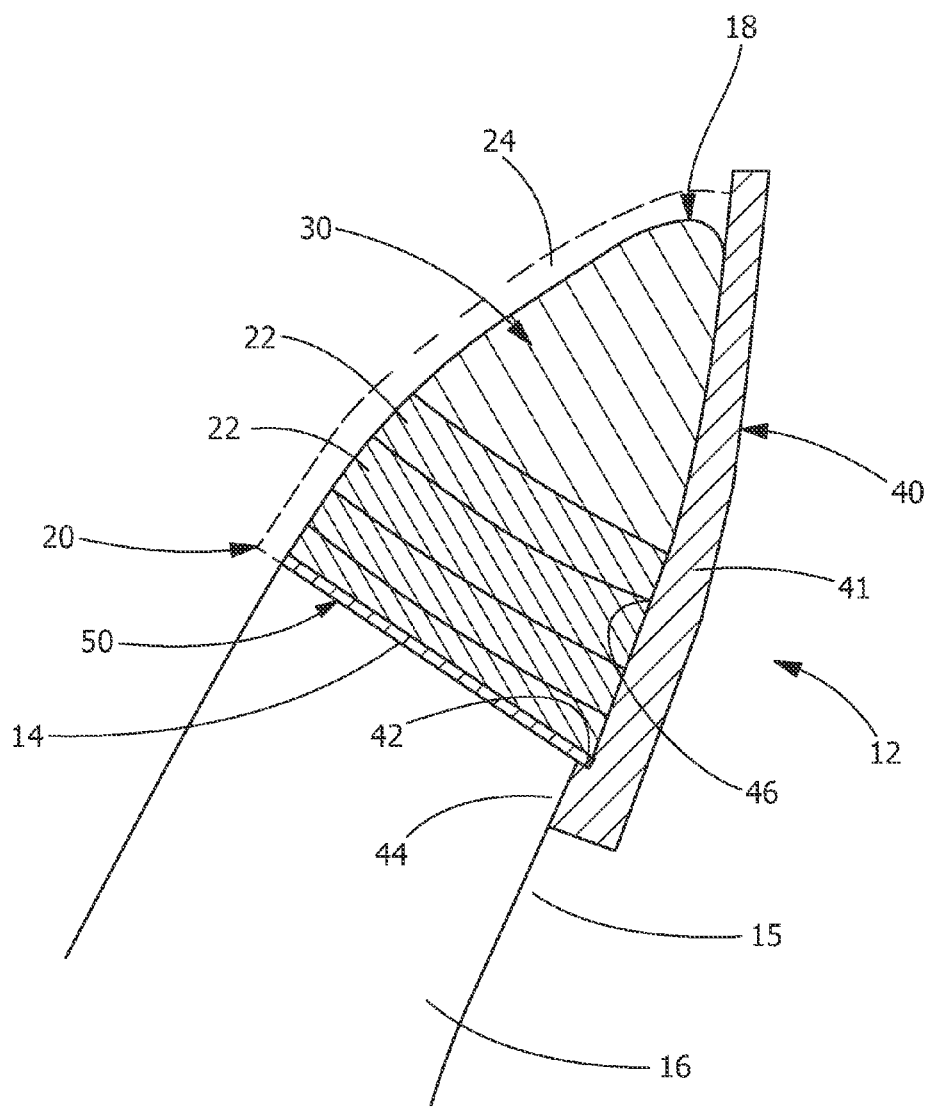
FIG. 3 is a schematic view of a turbine blade and an elongated backing plate of the present disclosure.
Figure 4:
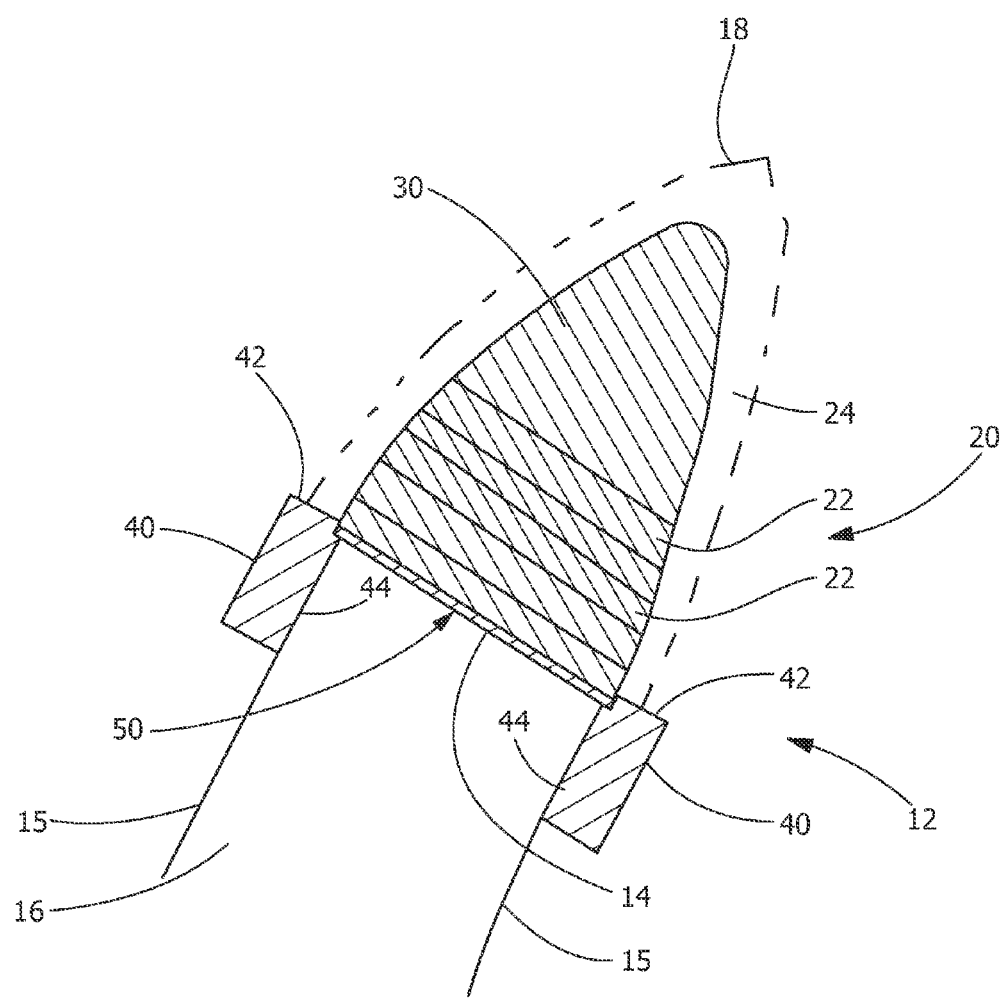
FIG. 4 is a schematic view of an alternative embodiment of a turbine blade and backing plate of the present disclosure.
Figure 5:
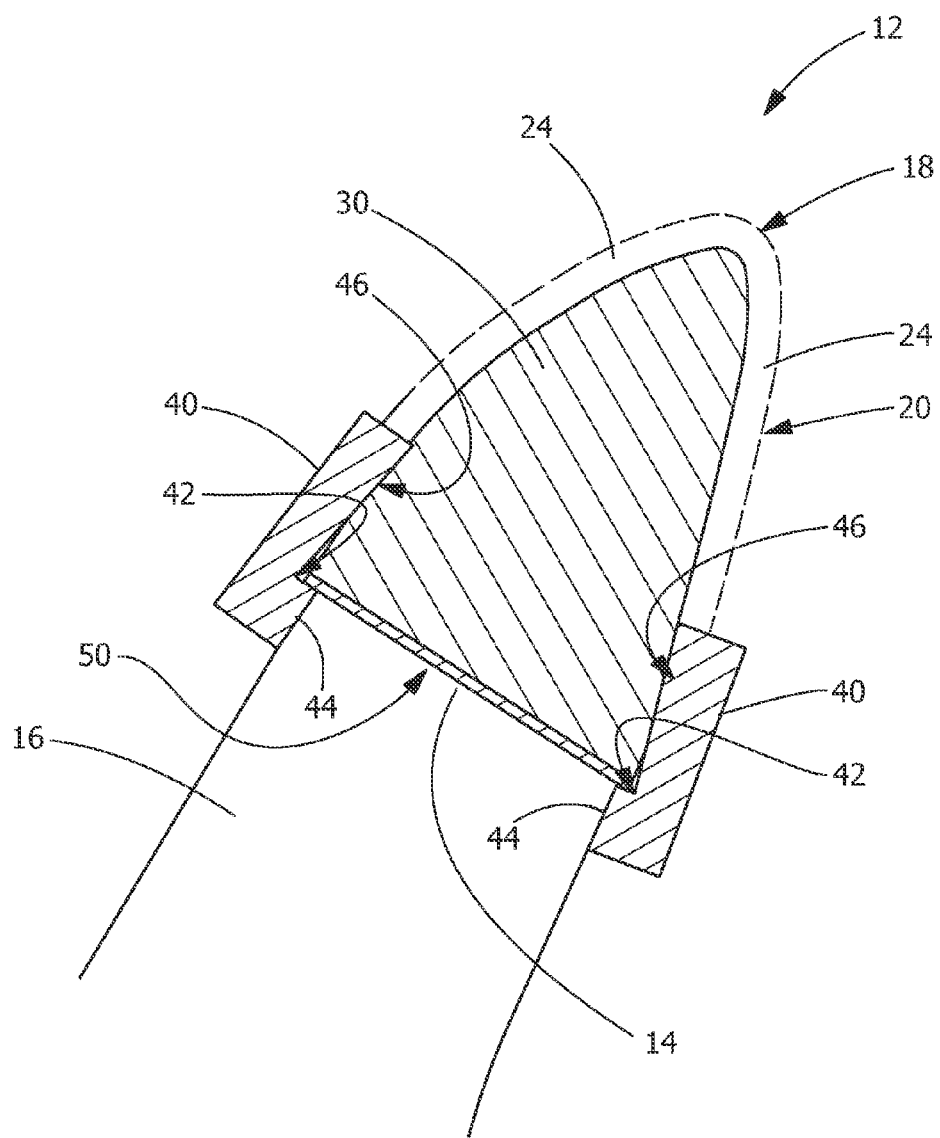
FIG. 5 is a schematic view of an exemplary alternate embodiment of a turbine blade and a backing plate of the present disclosure.

FIG. 1 depicts an embodiment of a portion of turbine 10 having a plurality of blades or airfoils 12 having a leading edge 18. FIG. 2 depicts a fusion bonding apparatus, namely a laser cladding apparatus 66. As shown in FIGS. 3-5, each blade 12 includes a forward face 14 at a forward end 16 of each blade 12. Leading edge 18 is formed at forward face 14 using fusion bonding to build-up an erosion shield 30 on forward face 14 using a backing plate 40.

As shown in FIG. 2, the method of forming blade 12 for turbine 10 includes positioning backing plate 40 adjacent at least one side 15 of forward face 14 of leading edge surface or forward end 16 of blade 12. Next, an erosion-resistant material 20 is deposited on forward face 14 at forward end 16 of blade 12 by fusion bonding. Fusion bonding erosion-resistant material 20 on forward face 14 forms erosion shield 30 and leading edge 18 (see FIG. 3). As shown in FIG. 2, erosion-resistant material 20 is deposited as a plurality of layers 22 that are built-up to form erosion shield 30 on the leading edge 18 of the blade 12 and along backing plate 40. In one embodiment, as shown in FIG. 2, an intermediate layer 50 is applied using a cladding technique prior to applying the backing plate 40 adjacent to side 15 of blade 12. The intermediate layer 50 is an austenitic nickel-chromium based superalloy, such as, but not limited to, INCONEL® 600 or INCONEL® 625, available from Special Metals Welding Products, Newton, N.C. Intermediate layer 50 can be a single layer or a plurality of layers. Intermediate layer 50 has a thickness of approximately 0.3 millimeters to approximately 2 millimeters or alternatively approximately 0.5 millimeters to approximately 1.7 millimeters or approximately 0.8 millimeters to approximately 1.5 millimeters.

Plurality of layers 22 of erosion resistant material 20 are applied using fusion bonding, such as, but not limited to, laser cladding and laser weld deposition. As shown in FIG. 2, a laser cladding apparatus 66 applies plurality of layers 22 of erosion resistant material 20 to blade 12. Laser cladding apparatus 66 includes a laser beam 64 and nozzle 62 for depositing powered material 60 to form the plurality of layers 22 of erosion resistant material 20 that forms erosion shield 30 (see FIG. 3). An example of suitable laser for laser cladding apparatus 66 includes, but is not limited to, a $CO_2$ laser, a Nd:YAG laser, a LED laser, a diode laser or a solid state laser. Lasers operate in pulsed or continuous mode with an output of between 100 watts and several kilowatts. In one embodiment, laser cladding apparatus 66 operates with a shielding gas, such as, but not limited to, argon and nitrogen.

Various exemplary embodiments of backing plates 40 are used to build-up plurality of layers 22 of erosion resistant material 20 to form erosion shield 30 on forward face 14 of blade 12 are depicted in FIGS. 3-5; however, these embodiments are for illustrative purposes only, and should not be so limiting. In other embodiments, backing plate 40 can be attached to the other or opposite side of blade 12 than what is shown in the figures. Modifications to geometry of backing plate 40 provide the desired final geometry for erosion shield 30. FIGS. 2-3 provide an example of an elongated backing plate 41.

As shown in FIGS. 2 and 3, erosion resistant materials 20 are applied as a plurality of layers 22. Erosion resistant materials 20 for erosion shield 30 include cobalt, chromium, tungsten, carbon, nickel, iron, silicon, molybendium, manganese, alloys thereof and combinations thereof. Suitable examples of erosion resistant material 20 to form erosion shield 30 include, but are not limited to, STELLITE® materials, such as STELLITE® 6, and 6B, available from the Deloro Stellite Group, Goshen, Ind. Other suitable examples, for erosion resistant materials 20, include, but are not limited to, hard deposit type materials containing tungsten or chromium carbides, and any other suitable erosion resistant material. Blade 12 is generally constructed from materials including, but not limited to, nickel, chromium, iron, molybdenum, niobium, cobalt, manganese, copper, aluminum, titanium, alloys thereof, and combinations thereof. Suitable examples of material for blade 12 include, but are not limited to, precipitation hardened stainless steel, such as Custom 450® available from Carpenter Technology Corporation, Reading, Pa. Backing plate 40 is constructed from materials that prevent carbon migration from blade 12 to built-up layers 22 of erosion shield 30. Suitable materials for backing plate 40 include, but are not limited to, low carbon steel having an ASTM 1015 designation.

FIG. 3 is a schematic of erosion shield 30 forming leading edge 18 of blade 12. Erosion shield 30 is substantially free any diffusion layer induced by backing plate 40. "Diffusion layer" as used herein, refers to the melted zone between erosion shield material (e.g. Stellite) deposited by a fusion process such as cladding and backing plate 40 made of a very different material (e.g. low carbon steel). This diffusion layer represents the intermixing of the two materials, erosion shield material and backing plate material, resulting in a zone of different chemistry and microstructure that lacks the erosion resistance capability of the undiluted erosion shield material. The step of removing the diffusion layer is accomplished by machining or grinding away backing plate 40 as well as the diffusion layer leaving the undiluted form of the erosion shield material and erosion shield 30. Generally, the diffusion layer is about 0.508 millimeters (about 0.02 inches) to about 1.016 millimeters (0.04 inches).

Backing plate 40, in this embodiment, elongated backing plate 41 is positioned adjacent at least one side 15 of forward face 14 of leading edge surface or forward end 16 of blade 12. Erosion shield 30 is formed using elongated backing plate 41 as a backstop to receive erosion-resistant material 20 by deposited as layers 22 by fusion bonding (see FIG. 2). Erosion resistant material 20 is deposited or applied along elongated backing plate 40 as a plurality of layers 22 to form erosion shield 30 and leading edge 18 of blade 12. In one embodiment, intermediate layer 50 is applied to forward face 14 of forward end 16 of blade 12 before plurality of layers 22 of erosion resistant material 20 are deposited on elongated backing plate 41 and forward face 14.

As depicted in FIGS. 2 and 3, backing plate 40 is positioned adjacent forward face 14 on side 15 of blade 12. Backing plate 40 is used as a backstop or template for applying erosion resistant material 20 in plurality of layers 22 to forward end 16 of blade 12. Erosion shield 30 is built-up in plurality of layers 22 on forward face 14 of blade 12 using laser cladding apparatus 66. In FIG. 2, for clarity, only two of plurality of layers 22 of erosion shield 30 are shown. As shown in FIGS. 2-3, backing plate 40 includes first surface 42, second surface 44 and third surface 46 for receiving erosion resistant material 20. Backing plate 40 is applied adjacent forward face 14, where erosion protection is desired. Backing plate 40 may be applied temporarily to forward face 14 of blade 12 by hard fixturing methods, such as, but not limited to, tack welding or clamping. Hard fixturing backing plate 40 to blade 12 holds backing plate 40 in position while of plurality of layers 22 of erosion resistant material 20 are deposited along third surface 46 of backing plate 40. First surface 42 of backing plate 40 is adjacent to intermediate layer 50. In one embodiment, intermediate layer 50 is applied prior to attaching backing plate 40 to blade 12. In an alternative embodiment, backing plate 40 is first temporarily attached to blade 12 and intermediate layer 50 is applied to forward face 14 and first surface 42 of backing plate 40. As shown in FIG. 3, third surface 46 of backing plate 40 receives plurality of layers 22 of erosion resistant material 20 to form erosion shield 30.

FIG. 4 is an alternative exemplary embodiment of backing plates 40 used to form erosion shield 30. In this embodiment, two backing plates 40 are placed adjacent each side 15 of blade 12. Backing plates 40 may be applied temporarily to forward face 14 of blade 12 by hard fixturing methods. Backing plates 40 include first surface 42 and second surface 44. In this embodiment, first surface 42 of each backing plate 40 is adjacent to intermediate layer 50 and second surface 44 of each backing plate 40 is adjacent side 15 of blade 12. In one embodiment, intermediate layer 50 is applied prior to attaching backing plate 40 to blade 12. In an alternative embodiment, backing plate 40 is first temporarily attached to blade 12 and intermediate layer 50 is applied to forward face 14 and first surface 42 of backing plate 40. As shown in FIG. 4, first surface 42 of backing plate 40 acts as a guide for receiving plurality of layers 22 of erosion resistant material 20 to form erosion shield 30. Erosion shield 30 is formed on forward face 14 of blade. Backing plates 40 serve as guides and templates for laser cladding apparatus 66 (see FIG. 2) to apply erosion resistant material 20 in a plurality of layers 22 to forward face 14 to form erosion shield 30. Additional erosion resistant material 20, depicted by the dotted line and labeled with reference numeral 24, is removed using any suitable technique, such as machining to form final leading edge 18 shape. Before or after machining, backing plates 40 are removed from blade 12.

FIG. 5 is another exemplary embodiment of backing plates 40 used to form erosion shield 30. In this embodiment, two backing plates 40 are placed adjacent each side 15 of blade 12. Backing plates 40 may be applied temporarily to forward face 14 of blade 12 by hard fixturing methods. Backing plates 40 includes first surface 42, second surface 44 and third surface 46. First surface 42 of each backing plate 40 is adjacent to intermediate layer 50 and second surface 44 of each backing plate 40 is adjacent side 15 of blade 12 and third surface 46 is adjacent deposited erosion resistant material 20. In one embodiment, intermediate layer 50 is applied prior to attaching backing plates 40 to blade 12. In an alternative embodiment, backing plate 40 is first temporarily attached to blade 12 and intermediate layer 50 is applied to forward face 14 and optionally applied first surface 42 of backing plates 40. As shown in FIG. 5, first surface 42 and third surface 46 of backing plates 40 act as a guide for receiving plurality of layers 22 of erosion resistant material 20 to form erosion shield 30. Erosion shield 30 is formed on forward face 14 of blade. Backing plates 40 serve as guides and templates for laser cladding apparatus 66 (see FIG. 2) to apply erosion resistant material 20 in a plurality of layers 22 to forward face 14 to form erosion shield 30. Additional erosion resistant material 20, depicted by the dotted line and labeled with reference numeral 24, is removed using any suitable technique, such as machining to form final leading edge 18 shape. Before or after machining, backing plates 40 are removed from blade 12.

Figure 6:
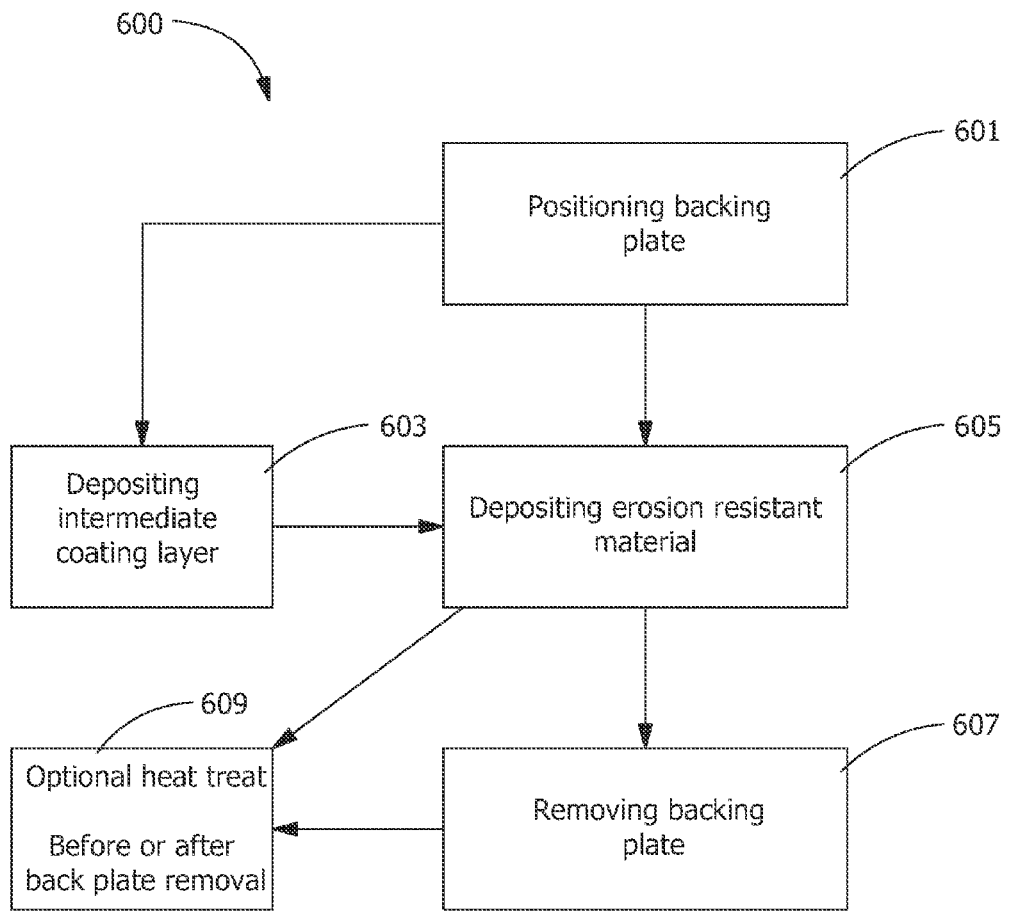
FIG. 6 is a flow chart of the method of forming a blade for a turbine of the present disclosure.

A method 600 for rendering blade 12 resistant to erosion is shown as a flowchart in FIG. 6. Method 600 includes positioning at least one backing plate 40 adjacent to at least one side 15 of forward face 14 of a leading edge surface of blade 12 (see FIGS. 3-5), step 601. Method 600 optionally includes an additional step of hard fixturing backing plate 40 adjacent forward face 14 of blade 12. Method includes bonding erosion resistant material 20 as plurality of layers 22 to forward face 14 of leading edge surface 18 of blade 12, wherein erosion resistant material 20 forms an erosion shield 30 and leading edge 18 of blade 12 (see FIGS. 3-5), step 605. Method 600 optionally includes depositing intermediate layer 50 to forward face 14 prior to the step of depositing 605, step 603. Method 600 also optionally includes heat treating blade 12 and erosion shield 30, before or after removing backing plate 40, step 609. Method 600 also includes removing backing plate(s) 40, leaving a formed erosion shield 30, step 607. The step of removing backing plate(s) 40, step 607, includes removing the diffusion layer by machining or grinding away backing plate 40 as well as the diffusion layer leaving the undiluted form of the erosion shield material and erosion shield 30. Generally, the diffusion layer is about 0.508 millimeters (about 0.02 inches) to about 1.016 millimeters (0.04 inches). Erosion shield 30 is substantially free of any diffusion layer induced by backing plate 40.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of forming a blade comprising:
positioning a backing plate adjacent at least one side of a forward face of a leading edge surface of the blade, wherein the backing plate extends past the leading edge surface to provide a mold to shape a leading edge of the blade into a final configuration;
depositing an erosion resistant material in a plurality of layers by fusion bonding the erosion resistant material to the forward face of the leading edge surface, wherein the plurality of layers of erosion resistant material form an erosion shield, the leading edge of the blade, and a diffusion layer between the backing plate and the erosion resistant material; and
removing the backing plate, wherein the erosion shield is substantially free of any diffusion layer induced by the backing plate;
wherein the positioning includes positioning the backing plate at a location that allows formation of the diffusion layer in a location capable of being removed.

2. The method of claim 1, wherein the erosion resistant material includes cobalt, chromium, tungsten, carbon, nickel, iron, silicon, molybdenum, manganese, alloys thereof and combinations thereof.

3. The method of claim 1, including an additional step of, prior to the step of depositing an erosion resistant material, applying at least one intermediate layer to the forward face of the leading edge surface.

4. The method of claim 3, wherein the at least one intermediate layer is an austenitic nickel-chromium-based superalloy.

5. The method of claim 3, wherein the at least one intermediate layer has a thickness of approximately 0.3 millimeters to approximately 2.0 millimeters.

6. The method of claim 1, wherein the backing plate comprises a carbon steel material.

7. The method of claim 1, wherein positioning the backing plate includes an additional step of hard fixturing the backing plate adjacent the forward face.

8. The method of claim 1, wherein the backing plate has a thickness of approximately 0.1 millimeters to approximately 12.7 millimeters.

9. The method of claim 1, including an additional step of, prior to the step of positioning the backing plate, preparing the forward face of the leading edge surface of the blade.

10. The method of claim 1, including an additional step of, after the step of removing the backing plate, machining the erosion shield.

11. The method of claim 1, wherein the step of positioning includes applying a first backing plate adjacent one side of the forward face of the blade and applying a second backing plate opposite the first backing plate adjacent the blade.

12. The method of claim 1, wherein a portion of the backing plate is positioned perpendicular to the forward face of the leading edge surface of the blade.

13. A method of forming a blade comprising:
positioning an elongated backing plate adjacent at least one side of a forward face of a leading edge surface of the blade, wherein the elongated backing plate extends past the leading edge surface to provide a mold to shape a leading edge of the blade into a final configuration;
depositing an erosion resistant material along the elongated backing plate by fusion bonding the erosion resistant material to the forward face of the leading edge surface and the elongated backing plate, wherein the erosion resistant material forms an erosion shield, the leading edge of the blade, and a diffusion layer between the elongated backing plate and the erosion resistant material; and
removing the elongated backing plate, wherein the erosion shield is substantially free of any diffusion layer induced by the elongated backing plate;
wherein the positioning includes positioning the elongated backing plate at a location that allows formation of the diffusion layer in a location capable of being removed.

14. The method of claim 13, wherein the backing plate comprises a carbon steel material.

15. The method of claim 1, wherein positioning the backing plate includes an additional step of hard fixturing the elongated backing plate adjacent the forward face.

16. The method of claim 1, wherein the backing plate has a thickness of approximately 4 millimeters to approximately 25 millimeters.

17. A method for rendering a blade resistant to erosion comprising:
positioning a backing plate adjacent to at least one side of a forward face of a leading edge surface of the blade, wherein the backing plate extends past the leading edge surface to provide a mold to shape a leading edge of the blade into a final configuration;
bonding an erosion resistant material to the forward face of the leading edge surface of the blade, wherein the erosion resistant material forms an erosion shield, the leading edge of the blade and a diffusion layer between the backing plate and the erosion resistant material; and
removing the backing plate, wherein the erosion shield is substantially free of any diffusion layer induced by the backing plate;
wherein the positioning includes positioning the backing plate at a location that allows formation of the diffusion layer in a location capable of being removed.

18. The method of claim 17, wherein the backing plate comprises a carbon steel material.

19. The method of claim 17, wherein positioning the backing plate includes an additional step of hard fixturing the elongated backing plate adjacent the forward face of the blade.

20. The method of claim 1, including an additional step of, after the step of removing the backing plate, machining the erosion shield.

* * * * *